(12) United States Patent
Hsu et al.

(10) Patent No.: US 7,475,996 B2
(45) Date of Patent: Jan. 13, 2009

(54) ELEVATING DEVICE

(75) Inventors: Wei-Po Hsu, Miao Li County (TW);
Chia-Lun Liu, Taipei Hsien (TW);
Tai-Li Chang, Miao Li County (TW)

(73) Assignee: Coretronic Corporation, Chu-Nan (TW)

( * ) Notice: Subject to any disclaimer, the term of this patent is extended or adjusted under 35 U.S.C. 154(b) by 450 days.

(21) Appl. No.: 11/405,625

(22) Filed: Apr. 18, 2006

(65) Prior Publication Data

US 2006/0244932 A1 Nov. 2, 2006

(30) Foreign Application Priority Data

Apr. 29, 2005 (TW) .............................. 94114042 A

(51) Int. Cl.
*G03B 21/14* (2006.01)
*F16M 11/04* (2006.01)

(52) U.S. Cl. .................. 353/70; 353/119; 248/419; 248/188.2

(58) Field of Classification Search .................. 353/69, 353/70, 119; 248/157, 419, 188.2, 188.3
See application file for complete search history.

(56) References Cited

U.S. PATENT DOCUMENTS

| 6,715,890 B2* | 4/2004 | Huang et al. ................. 353/119 |
| 6,793,348 B2* | 9/2004 | Lee et al. ..................... 353/119 |
| 6,796,538 B2* | 9/2004 | Hsu et al. ................ 248/188.2 |
| 2002/0140909 A1* | 10/2002 | Tanaka ......................... 353/70 |
| 2005/0078283 A1* | 4/2005 | Lee et al. ..................... 353/119 |

* cited by examiner

*Primary Examiner*—William C. Dowling
(74) *Attorney, Agent, or Firm*—Birch, Stewart, Kolasch & Birch, LLP

(57) ABSTRACT

An elevating device includes first and second rack members interconnecting each other in such a manner to protrude downwardly from a lower opening of an outer casing in a double-step manner so as to be supported on a support surface. The elevating device adjusts an inclination angle of the outer casing relative to the support surface.

9 Claims, 5 Drawing Sheets

ELEVATING DEVICE

FIELD OF THE INVENTION

The invention relates to an elevating device, more particularly to a elevating device for use in a projector.

BACKGROUND OF THE INVENTION

Referring to FIG. 1, a conventional projector is shown to include an outer casing 2 provided with a projection lens for projecting an image onto a screen. The outer casing 2 is further provided with an elevating device 6 for adjusting an inclination angle of a front end of the outer casing 2 with respect to a support surface. The outer casing 2 has a front wall formed with a front opening 10 and a bottom wall formed with a lower opening 4.

Referring to FIGS. 1 and 2, the elevating device 6 includes a base plate 18, a generally rectangular push member 602, a partition 1802, an urging member 28, a rack member 26. The base plate 18 is disposed securely on the bottom wall of the outer casing 2, and is formed with a rack aperture 19 in aligned with the lowering opening 4. The push member 602 is disposed slidably on the base plate 18 around the rack aperture 19, and has a press button 20 protruding outwardly from the front wall via the front opening 10. The push member 602 further has a front portion integrally formed with the press button 20, a rear portion 24 formed with a row of teeth 2402, and an intermediate portion 22 interconnecting the front and rear portions 24. The partition 1802 is fixed to the base plate 18 transverse to the rack aperture 19, and extends upwardly from the base plate 18. The rack member 26 is disposed uprightly within the rack aperture 19 in the base plate 18 behind the partition 1802. The urging member 28 is disposed between the partition 1802 and the front portion of the push member 20, and urges the push member 20 in the forward direction with respect to the base plate 18, thereby resulting in engagement between the rack member 26 and one of the teeth 2402 on the rear portion 24 of the push member 602. Preferably, a support pad 8, for example a soft pad is fixed to a lower end of the rack member 26 to permit resting of the rack member 26 on the support surface.

When it is desired to adjust the inclination angle of the outer casing 2 with respect to the support surface, the press button 20 is pressed inwardly relative to the outer casing 2 so as to result in rearward movement of the push member 602 relative to the base plate 18, which in turn, results in disengagement of the rack member 26 from the rear portion 24 of the push-member 602. Under this condition, the lower end of the rack member 26 protrudes outwardly from the outer casing 2 via the lower opening 4 by virtue of gravity thereof. To retract the rack member 26 into the outer casing 2, the same can be manually pushed upward against the urging force of the urging member 28.

The aforesaid rack member 26 though can adjust the inclination angle of the outer casing 2 with respect to the support surface, the inclination adjustment thereof is not ideal due to the compact size of the outer casing 2. Increase in the longitudinal length of the rack member 26 may result in a larger dimension of the outer casing 2. It is against trend of manufacturers to produce the conventional projector in the compact size.

SUMMARY OF THE INVENTION

The object of the present invention is to provide an elevating device that can lift or lower a projector in a double-step manner, thereby overcoming the disadvantage encountered during use of a conventional projector.

According to the present invention, an elevating device is provided to include a base plate defining a longitudinal direction and formed with a through hole that extends in a transverse direction with respect to the longitudinal direction, the base plate having a top cover projecting upwardly therefrom to shield the through hole from above, the top cover having opposite front and rear portions; a sliding member disposed on the base plate surrounding the top cover, and slidable relative to the base in the longitudinal direction, the sliding member including a pushing part adjacent to the front portion of the top cover, a coupling part adjacent to the rear portion of the top cover, and a first engaging tongue projecting from the coupling part into the top cover; a first urging member disposed between the pushing part of the sliding member and the front portion of the top cover; a hollow wall structure disposed within the top cover adjacent to the front portion, and extendible outwardly in the transverse direction from the top cover via the through hole; a first rack member disposed within the top cover behind the hollow wall structure and spaced apart from the first engaging tongue, the first rack member having a second engaging tongue projecting forwardly to support the hollow wall structure constantly thereabove, thereby retaining the hollow wall structure within the top cover; a second rack member disposed movably within the hollow wall structure, and having a lower section projecting outwardly from the hollow wall structure to engage the second tongue of the first rack member such that the first rack member is movable together with the second rack member in case the second rack member moves further downward in the transverse direction; a second urging member disposed between the hollow wall structure and the first rack member, and biasing the hollow wall structure to press the first rack member to engage with the first tongue of the sliding member, thereby retaining the first rack member within the top cover; and a third urging member disposed within the top cover for urging the second rack member in the transverse direction to protrude outwardly from the hollow wall structure in the transverse direction.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCCRIPTIONS OF THE PREFERRED EMBODIMENT

Figure 1:
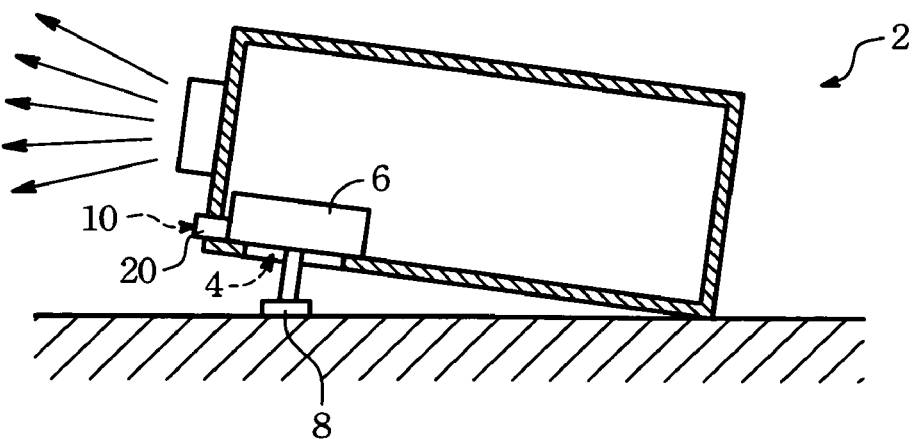
FIG. 1 is a sectional side view of a conventional projector.
Figure 2:
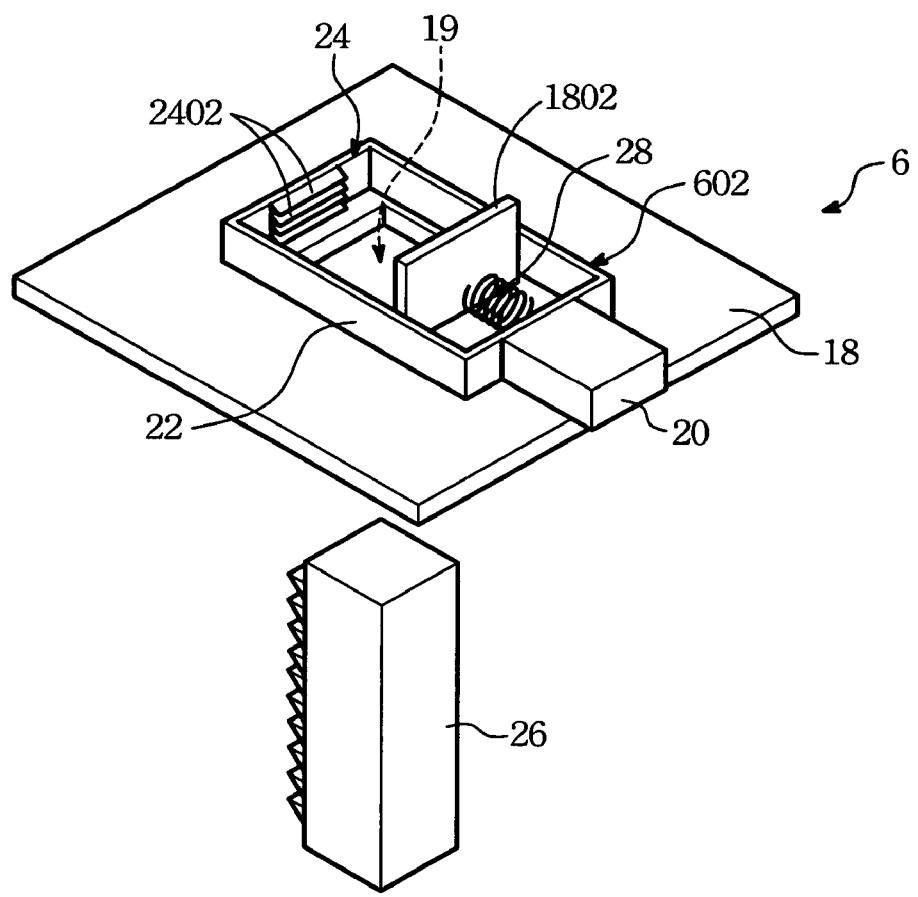
FIG. 2 shows an exploded view of a conventional elevating device employed in the conventional projector of FIG. 1.
Figure 3:
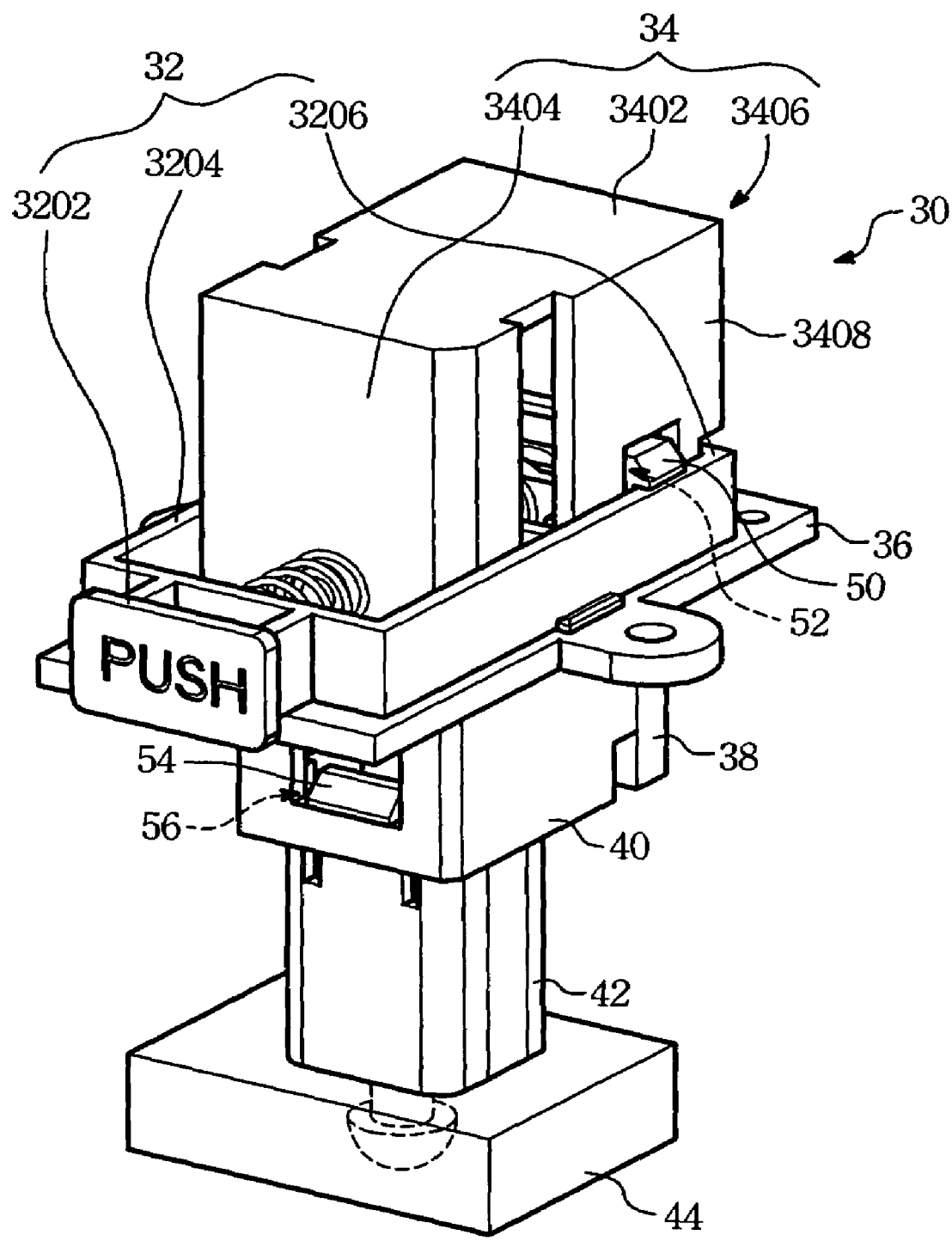
FIG. 3 is a perspective view of an elevating device employed in a projector of the present invention.
Figure 4:
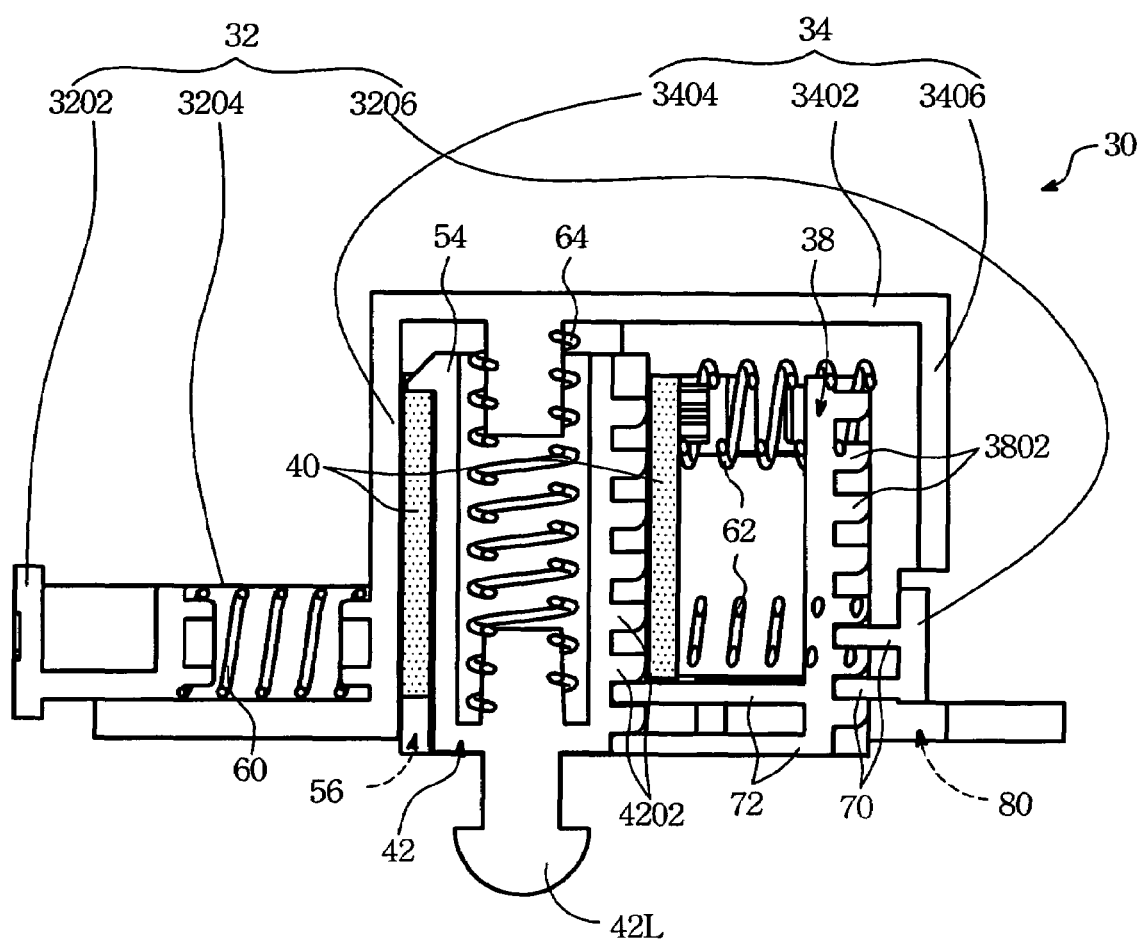
FIG. 4 is a sectional view illustrating an interior of the elevating device of FIG. 3 in an initial condition.

Referring to FIGS. 3 and 4, a projector of the present invention includes an outer casing (see FIG. 1) and an elevating device 30 employed in the outer casing in order to adjust an inclination angle of the outer casing with respect to a support surface, as best shown in FIG. 1. The outer casing is provided with a projection lens (not visible) for projecting an image onto a screen away from the outer casing.

The elevating device 30 includes a base plate 36, a sliding member 32, a first urging member 60, a hollow wall structure 40, a first rack member 38, a second rack member 42, a second urging member 62 and a third urging member 64.

The base plate 36 is disposed securely on the bottom wall of the outer casing (see FIG. 1), defines a longitudinal direction. The base plate 36 is formed with a through hole 80 that extends in a transverse direction with respect to the longitudinal direction. The base plate 36 has a top cover 34 protruding upwardly therefrom to shield the through hole 80. The top cover 34 has opposite front and rear portions 3404, 3406, a top wall 3402 interconnecting the front and rear portions 3404, 3406, and two lateral walls 3408 extending downwardly from the top wall 3402 and terminating adjacent to the through hole 80 in the base plate 36. Each of the lateral walls 3408 is formed with an upper retention recess 52 (generally a through hole).

The sliding member 32 is disposed on the base plate 36 surrounding the top cover 34, and is slidable relative to the base plate 36 in the longitudinal direction. The sliding member 32 is including a pushing part 3202 adjacent to the front portion 3404 of the top cover 34, a coupling part 3206 adjacent to the rear portion 3406 of the top cover 34, two intermediate parts 3204 interconnecting the pushing part 3202 and the coupling part 3206, and a first engaging tongue 70 protruding from the coupling part 3206 into the top cover 34.

The first urging member 60 (generally a coil spring) is disposed between the pushing part 3202 of the sliding member 32 and the front portion 3404 of the top cover 34.

The hollow wall structure 40 is disposed within the top cover 34 adjacent to the front portion 3404 and is extendible outwardly in the transverse direction from the top cover 34 via the through hole 80.

The first rack member 38 is disposed within the top cover 34 behind the hollow wall structure 40, and is spaced apart from the first engaging tongue 70 of the coupling part 3206. The first rack member 38 has a second engaging tongue 72 protruding forwardly to support the hollow wall structure 40, thereby retaining the hollow wall structure 40 within the top cover 34 at an initial position.

The second rack member 42 is disposed movably within the hollow wall structure 40, and has tooth 4202 and a lower section 42L. The second rack member 42 is protruding outwardly from the hollow wall structure 40 in the transverse direction so that the lowest tooth 4202 of the second rack member 42 engages the second tongue 72 of the first rack member 38 such that the first rack member 38 is movable together with the second rack member 42 when the second rack member 42 moves further downward in the transverse direction with respect to the top cover 34.

The second urging member 62 (generally two coil springs) is disposed between the hollow wall structure 40 and the first rack member 38, and biasing the hollow wall structure 40 to press the first rack member 38 to engage with the first tongue 70 of the sliding member 32, thereby retaining the first rack member 38 within the top cover 34 at an initial position.

The third urging member 64 is fixed to a spring-holing mast at the top wall 3402 of the top cover 34 for urging the second rack member 42 in the transverse direction to protrude outwardly from the hollow wall structure 40.

It is noted that the hollow wall structure 40 has an upper end, a lower end, and a lower retention recess 56 that is disposed at an elevation below the upper retention recess 52 in the top cover 34. The second rack member 42 has an upper portion formed with an engaging hook 54 hooking the upper end of the hollow wall structure 40 so as to enhance retaining of the second rack member 42 within the hollow wall structure 40. The first engaging hook 54 of the second rack member 42 is capable of hooking the lower retention recess 56 in the hollow wall structure 40 once the second rack member 42 is protruded outwardly from the hollow wall structure 40 by virtue of the third urging member 64. The upper end of the hollow wall structure 40 is formed with an engaging hook 50 for hooking the upper retention recess 52 in the top cover 34 so as to limit outward protrusion of the first rack member 38 from the top cover 34 when the first rack member 38 moves downward together with the second rack member 42 during outward protrusion of the hollow wall structure 40 from the top cover 34. A detail description of adjusting the inclination angle of the outer casing with respect to the support surface will be given in the following paragraphs.

Referring again to FIG. 1, the elevating device 30 is installed within the outer casing 2 of the projector, the through hole 80 in the base plate 36 is aligned with the opening 4 in the lower wall portion of the outer casing 2 so as to permit protrusion of the lower section 42L of the second rack member 42 via the opening 4, after the pushing part 3202 of the sliding member 32 is pushed by the user. The pushing part 3202 of the sliding member 32 protrudes outwardly from the front opening in the front wall portion of the outer casing 2. Under this condition, the outer casing 2 defines a small inclination angle with respect to the support surface. In order to facilitate resting the second rack member 42 on the support surface, a soft pad 44 is fixed to an end of the lower section 42L.

Figure 5:
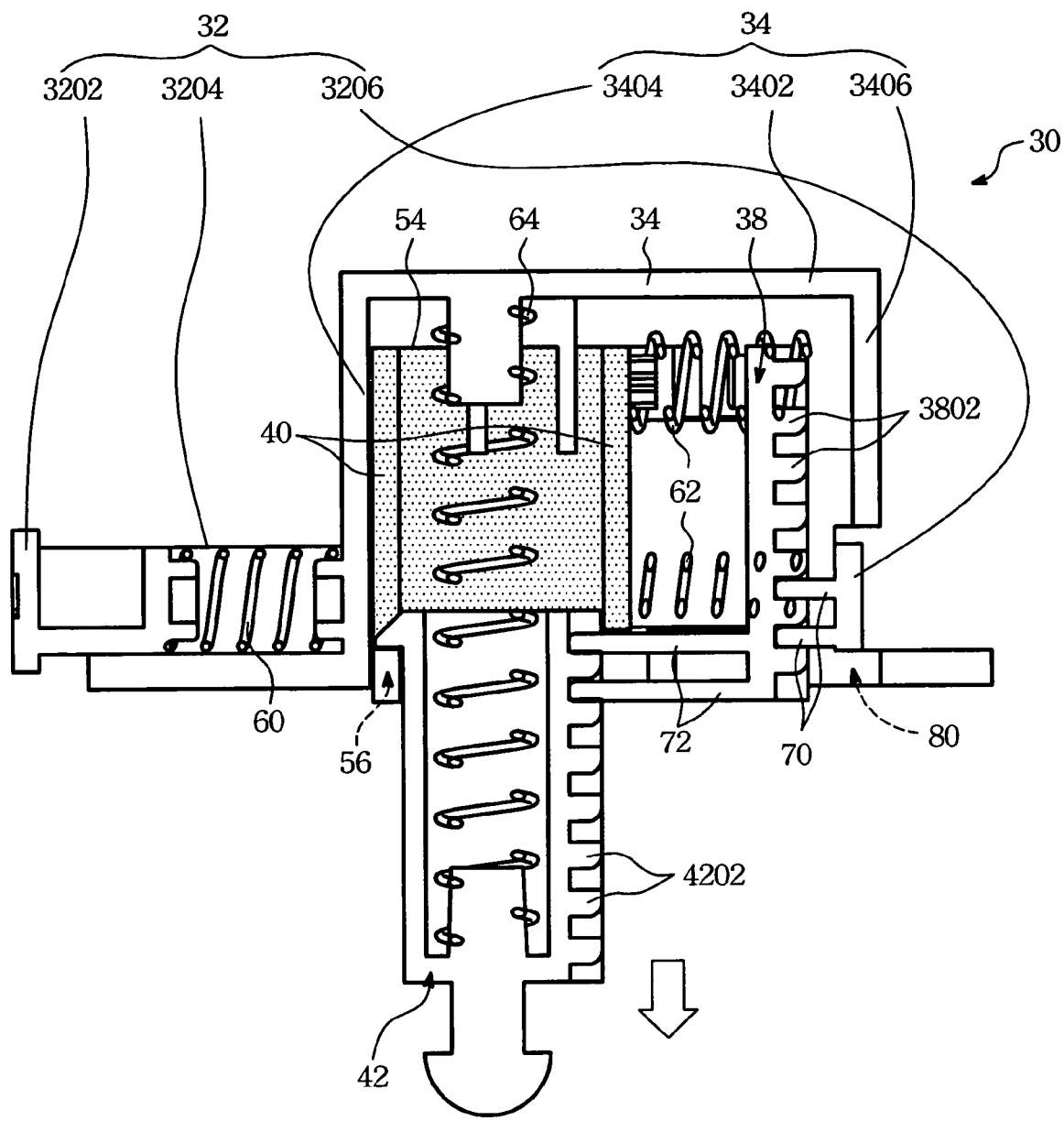
FIG. 5 is a sectional view illustrating showing a rack member protruded outwardly from a top cover of the elevating device of FIG. 3.

Referring to FIG. 5, an external force is applied onto the pushing part 3202 of the sliding member 32, thereby moving the sliding member 32 rearward in the longitudinal direction relative to the base plate 36, wherein the first urging member 60 is compressed due to the external force while the second urging member 62 is allowed to restore to an initial length of itself. Restoring movement of the sliding member 62 results in disengagement of the second rack member 42 from the second engaging tongue 72 of the first rack member 38, thereby protruding the second rack member 42 outwardly from the wall structure 40. The extension of the second rack member 42 from the wall structure 40 is stopped once the first engaging hook 54 of the second rack member 42 hooks the lower retention recess 56 in the hollow wall structure 40.

Figure 6:
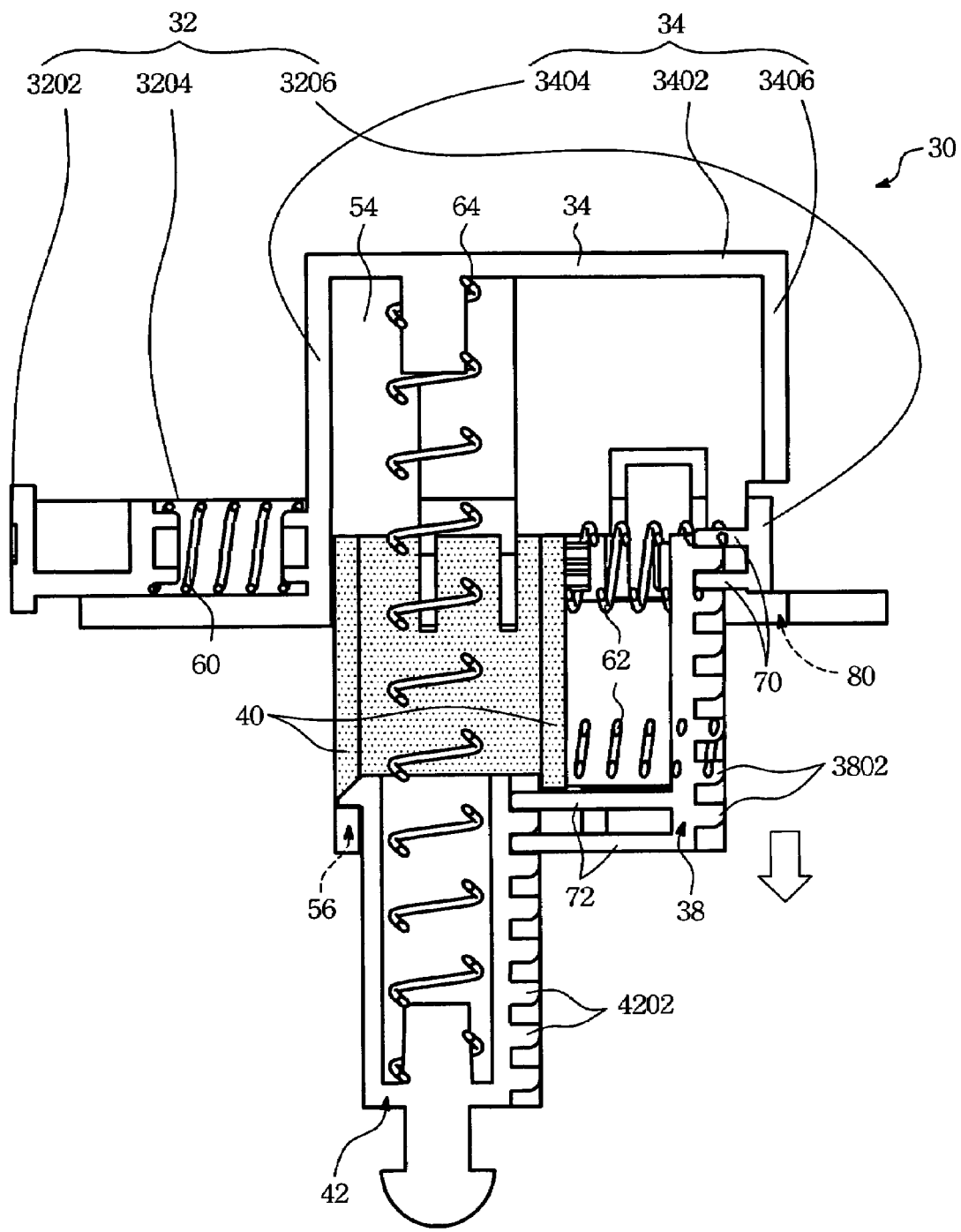
FIG. 6 is a sectional view illustrating showing two rack members are simultaneously protruded outwardly from the top cover of the elevating device of FIG. 3.

In the event the user is not satisfied with the inclination angle of the outer casing shown in FIG. 5, the user can apply another external force on the pushing part 3202 of the sliding member 32, thereby causing the sliding member 32 to move in the rearward direction with respect to the base plate 36. Rearward movement of the sliding member 32 relative to the base plate 36 results in disengagement of the first rack member 38 from the first engaging tongue 70. Under this condition, the assembly of the first rack member 38 and the hollow wall structure 40 is pushed downward by the third urging member 64 since the first rack member 38 is coupled to the wall structure 40 via the second engaging tongue 72, thereby further protruding the second rack member 42 downward with respect to the top cover 34, as best shown in FIG. 6. The downward extension of the first rack member 38 from the top cover 34 is stopped once the engaging hook 50 of the wall structure 40 hooks the upper retention recess 52 in the top cover 34.

To summarize the above paragraphs, it is observable that employment of the first and second rack members in an overlapping manner does not cause an increase in the thickness of the outer casing. However, the total length of the rack members in the transverse direction can be greatly increased. Though only two rack members are utilized in the present elevating device, the scope of the present invention should not be limited solely to the disclosed embodiment, but should cover all embodiments within the spirit of the present invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An elevating device comprising:
   a base plate defining a longitudinal direction and formed with a through hole extending in a transverse direction with respect to said longitudinal direction, said base plate having a top cover protruding upwardly therefrom to shield said through hole, said top cover having opposite front and rear portions;
   a sliding member disposed on said base plate surrounding said top cover, and slidable relative to said base plate in said longitudinal direction, said sliding member including a pushing part adjacent to said front portion of said top cover, a coupling part adjacent to said rear portion, and a first engaging tongue protruding from said coupling part into said top cover;
   a first urging member disposed between said pushing part and said front portion;
   a hollow wall structure disposed within said top cover adjacent to said front portion, and extendible outwardly in said transverse direction from said top cover;
   a first rack member disposed within said top cover behind said hollow wall structure and spaced apart from said first engaging tongue, said first rack member having a second engaging tongue protruding forwardly to support said hollow wall structure, thereby retaining said hollow wall structure within said top cover;
   a second rack member disposed movably within said hollow wall structure, and having a lower section protruding outwardly from said hollow wall structure in said transverse direction to engage said second tongue of said first rack member such that said first rack member is movable together with said second rack member when said second rack member moves further downward in said transverse direction;
   a second urging member disposed between said hollow wall structure and said first rack member, and biasing said hollow wall structure to press said first rack member to engage with said first tongue of said sliding member, thereby retaining said first rack member within said top cover; and
   a third urging member disposed within said top cover for urging said second rack member in said transverse direction to protrude outwardly from said hollow wall structure.

2. The elevating device according to claim 1, wherein said sliding member further includes at least one intermediate part interconnecting said pushing part and a coupling part so as to permit simultaneous movement of said pushing and coupling parts.

3. The elevating device according to claim 1, wherein said top cover further has a top wall interconnecting said front and rear portions, and at least one lateral wall, said third urging member being fixed to said top wall for urging said second rack member to protrude outwardly from said hollow wall structure.

4. The elevating device according to claim 3, wherein said hollow wall structure includes an upper end and a lower retention recess distal from said upper end, said second rack member having an upper portion formed with a first engaging hook hooking said upper end of said hollow wall structure so as to enhance retaining of said second rack member within said hollow wall structure, said first engaging hook of said second rack member capable of hooking said lower retention recess in said hollow wall structure once said second rack member is protruded outwardly from said hollow wall structure by virtue of said third urging member.

5. The elevating device according to claim 4, wherein said top cover further has at least one lateral wall that interconnects said front and rear portions, that is formed with an upper retention recess and that is disposed at an elevation above said lower retention recess in said hollow wall structure, said upper end of said hollow wall structure being formed with a second engaging hook for hooking said upper retention recess in said top cover so as to limit outward extension of said first rack member from said top cover when said first rack member moves together with said hollow wall structure during outward movement of said hollow wall structure from said top cover.

6. The elevating device according to claim 5, wherein the elevating device is adapted to be mounted within an assembly including an outer casing having a lower wall portion formed with an opening, a base plate adapted to be disposed on the lower wall portion in such a manner that said through hole is aligned with the opening in the lower wall portion of the outer casing to permit protrusion of assembly of said hollow wall portion and said first and second rack members via the opening.

7. The elevating device according to claim 6, further comprising a soft pad fixed to an end of a lower section of said second rack member for resting said second rack member on a support surface.

8. The elevating device according to claim 6, wherein the outer casing has a front wall portion formed with a front opening, said pushing part of said sliding member protruding outwardly through the front opening of the front wall portion of the outer casing.

9. The elevating device according to claim 6, wherein said assembly is a projector.

* * * * *